(12) United States Patent
Di Federico et al.

(10) Patent No.: US 10,719,289 B2
(45) Date of Patent: Jul. 21, 2020

(54) MONITORING AND CONTROL DISPLAY SYSTEM AND METHOD USING MULTIPLE DISPLAYS IN A WORK ENVIRONMENT

(71) Applicant: Topcon Positioning Systems, Inc., Livermore, CA (US)

(72) Inventors: Ivan Giovanni Di Federico, Argenta (IT); Dimitre Markov, Holden Hill (AU); Kash Munir, Westbourne Park (AU); Andrew Davis, Erindale (AU); Lyndon Whaite, Uraidla (AU); John Boal, Mawson Lakes (AU); Stefan Stefanov, Sheidow Park (AU)

(73) Assignee: Topcon Positioning Systems, Inc., Livermore, CA (US)

( * ) Notice: Subject to any disclaimer, the term of this patent is extended or adjusted under 35 U.S.C. 154(b) by 0 days.

(21) Appl. No.: 14/933,568

(22) Filed: Nov. 5, 2015

(65) Prior Publication Data

US 2017/0131959 A1    May 11, 2017

(51) Int. Cl.
| | |
|---|---|
| G06F 3/048 | (2013.01) |
| G06F 3/147 | (2006.01) |
| G09G 5/00 | (2006.01) |
| G06F 3/14 | (2006.01) |
| G09G 5/14 | (2006.01) |
| A01B 69/00 | (2006.01) |

(52) U.S. Cl.
CPC ............ *G06F 3/147* (2013.01); *G06F 3/1454* (2013.01); *G09G 5/006* (2013.01); *A01B 69/001* (2013.01); *G09G 5/14* (2013.01); *G09G 2354/00* (2013.01); *G09G 2370/06* (2013.01)

(58) Field of Classification Search
CPC ....... G06F 3/147; G06F 3/1454; G09G 5/006; G09G 5/14; G09G 2354/00; G09G 2370/06; A01B 69/001
See application file for complete search history.

(56) References Cited

U.S. PATENT DOCUMENTS

| | | | |
|---|---|---|---|
| 6,064,943 A | 5/2000 | Clark, Jr. et al. | |
| 8,587,546 B1 | 11/2013 | El-Khoury | |
| 9,030,149 B1 * | 5/2015 | Chen | F16M 13/04 |
| | | | 318/649 |
| 9,361,736 B1 * | 6/2016 | Costantino | G07C 5/008 |

(Continued)

FOREIGN PATENT DOCUMENTS

| | | |
|---|---|---|
| EP | 2821864 B1 | 10/2015 |
| WO | 2009143294 A3 | 11/2009 |
| WO | 2014151453 A1 | 9/2014 |

OTHER PUBLICATIONS

International Search Report and Written Opinion dated Aug. 7, 2014, in connection with International Patent Application No. PCT/US14/25764, 6 pgs.

(Continued)

*Primary Examiner* — Jose R Soto Lopez
(74) *Attorney, Agent, or Firm* — Chiesa Shahinian & Giantomasi PC

(57) ABSTRACT

A method and system is provided for controlling a display in a machine operating in a work area whereby a plurality of views are displayed on a screen with each of the plurality of views corresponding to a plurality of functions and having one or more of the views independently available on another display.

30 Claims, 8 Drawing Sheets

(56) References Cited

U.S. PATENT DOCUMENTS

| | | | |
|---|---|---|---|
| 9,541,905 B2* | 1/2017 | Nixon | G06F 3/048 |
| 9,671,954 B1 | 6/2017 | Jaugilas et al. | |
| 2003/0209638 A1* | 11/2003 | Peltz | B61L 3/127 |
| | | | 246/167 R |
| 2007/0213906 A1* | 9/2007 | Montgomery | A01B 63/00 |
| | | | 701/50 |
| 2008/0154691 A1* | 6/2008 | Wellman | G06Q 10/0639 |
| | | | 705/7.26 |
| 2008/0208395 A1* | 8/2008 | Self | G05D 1/0278 |
| | | | 701/2 |
| 2010/0039247 A1* | 2/2010 | Ziegler | G06Q 10/06 |
| | | | 340/436 |
| 2010/0063954 A1* | 3/2010 | Anderson | G05D 1/0221 |
| | | | 706/50 |
| 2010/0106344 A1* | 4/2010 | Edwards | E02F 9/205 |
| | | | 701/2 |
| 2010/0185955 A1* | 7/2010 | Kato | G06F 3/1423 |
| | | | 715/751 |
| 2011/0055720 A1* | 3/2011 | Potter | G06F 3/017 |
| | | | 715/747 |
| 2011/0063510 A1* | 3/2011 | Lee | G02F 1/133605 |
| | | | 348/563 |
| 2011/0106422 A1* | 5/2011 | Gould | A01B 69/001 |
| | | | 701/533 |
| 2012/0229394 A1* | 9/2012 | Ehrl | G05B 19/042 |
| | | | 345/173 |
| 2012/0256843 A1* | 10/2012 | Epple | A01D 41/127 |
| | | | 345/169 |
| 2012/0324404 A1 | 12/2012 | Pahlavan et al. | |
| 2013/0162582 A1* | 6/2013 | Hatano | B60K 37/06 |
| | | | 345/173 |
| 2013/0164083 A1* | 6/2013 | Elia | B09C 1/00 |
| | | | 405/128.45 |
| 2013/0210488 A1* | 8/2013 | Lee | G06F 9/452 |
| | | | 455/557 |
| 2013/0211628 A1* | 8/2013 | Thurow | G06F 17/00 |
| | | | 701/2 |
| 2013/0232186 A1* | 9/2013 | Ingram | G05B 19/409 |
| | | | 709/203 |
| 2013/0241827 A1* | 9/2013 | Ronkainen | G06F 3/0488 |
| | | | 345/157 |
| 2013/0246946 A1* | 9/2013 | Iwasaki | G06F 3/048 |
| | | | 715/761 |
| 2013/0305163 A1* | 11/2013 | Farmer | G06F 9/54 |
| | | | 715/748 |
| 2013/0335300 A1* | 12/2013 | Tajima | G06F 3/1454 |
| | | | 345/2.3 |
| 2014/0053094 A1* | 2/2014 | Grevinga | G06F 3/04883 |
| | | | 715/771 |
| 2014/0116735 A1* | 5/2014 | Bassett | A01C 7/205 |
| | | | 172/2 |
| 2014/0240506 A1* | 8/2014 | Glover | H04N 7/181 |
| | | | 348/159 |
| 2014/0257623 A1* | 9/2014 | Carl | G07C 5/008 |
| | | | 701/29.4 |
| 2014/0273827 A1* | 9/2014 | Killpack | H04L 69/04 |
| | | | 455/41.1 |
| 2014/0282229 A1* | 9/2014 | Laukkanen | G06F 3/0481 |
| | | | 715/788 |
| 2014/0282257 A1* | 9/2014 | Nixon | H04L 67/42 |
| | | | 715/835 |
| 2014/0306865 A1* | 10/2014 | Pan | G06F 3/1423 |
| | | | 345/2.1 |
| 2014/0325419 A1* | 10/2014 | Andersen | B60K 35/00 |
| | | | 715/771 |
| 2014/0331146 A1* | 11/2014 | Ronkainen | G06F 3/0482 |
| | | | 715/741 |
| 2014/0350752 A1* | 11/2014 | Gelinske | A01C 7/081 |
| | | | 701/2 |
| 2014/0365580 A1* | 12/2014 | Azenkot | H04W 4/026 |
| | | | 709/205 |
| 2014/0371979 A1* | 12/2014 | Drew | A01B 79/005 |
| | | | 701/32.3 |
| 2015/0006025 A1* | 1/2015 | Rhoades | A01D 34/006 |
| | | | 701/33.2 |
| 2015/0052447 A1* | 2/2015 | Ritesh | H04L 67/125 |
| | | | 715/740 |
| 2015/0063129 A1* | 3/2015 | Blasinski | H04W 4/70 |
| | | | 370/252 |
| 2015/0113464 A1* | 4/2015 | Brush | B60K 35/00 |
| | | | 715/772 |
| 2015/0116132 A1* | 4/2015 | Nohra | H04Q 9/00 |
| | | | 340/870.07 |
| 2015/0153456 A1 | 6/2015 | Feller et al. | |
| 2015/0161872 A1* | 6/2015 | Beaulieu | B66C 13/40 |
| | | | 340/686.6 |
| 2015/0211876 A1* | 7/2015 | Edelen | G01C 21/36 |
| | | | 701/1 |
| 2015/0243114 A1* | 8/2015 | Tanabe | G07C 5/008 |
| | | | 701/123 |
| 2015/0278734 A1* | 10/2015 | Grant | E21B 41/0092 |
| | | | 705/7.23 |
| 2015/0366124 A1* | 12/2015 | Kremmer | A01B 59/06 |
| | | | 701/2 |
| 2015/0379785 A1* | 12/2015 | Brown, Jr. | A01B 79/005 |
| | | | 701/29.1 |
| 2016/0033038 A1* | 2/2016 | Kobayashi | F16H 63/42 |
| | | | 701/64 |
| 2016/0034058 A1* | 2/2016 | Stauber | G08C 17/02 |
| | | | 345/173 |
| 2016/0041803 A1* | 2/2016 | Markov | G06F 3/147 |
| | | | 701/48 |
| 2016/0062726 A1* | 3/2016 | Takamura | G06F 3/1454 |
| | | | 345/2.2 |
| 2016/0132046 A1* | 5/2016 | Beoughter | G05B 19/4184 |
| | | | 700/17 |
| 2016/0149969 A1* | 5/2016 | Farmer | G06Q 10/101 |
| | | | 709/204 |
| 2016/0231888 A1* | 8/2016 | Govindraj | G06F 3/0482 |
| 2016/0241905 A1* | 8/2016 | Gao | G06F 3/1431 |
| 2016/0246296 A1* | 8/2016 | Gelinske | H04W 4/70 |
| 2016/0259611 A1* | 9/2016 | Park | G06F 3/1431 |
| 2016/0266610 A1* | 9/2016 | Nessel | E01C 23/00 |
| 2016/0291590 A1* | 10/2016 | Kuniyasu | G06Q 50/02 |
| 2016/0331035 A1* | 11/2016 | Cameron | F01K 5/00 |
| 2017/0017392 A1* | 1/2017 | Castaneda | B66F 9/0759 |
| 2017/0032473 A1* | 2/2017 | Koch | G06Q 10/06398 |
| 2017/0045009 A1* | 2/2017 | Ueda | F02D 41/0215 |
| 2017/0055433 A1* | 3/2017 | Jamison | G05D 1/104 |
| 2017/0060134 A1* | 3/2017 | Buhler | G05D 1/0295 |
| 2017/0090741 A1* | 3/2017 | Tentinger | G06F 8/38 |
| 2017/0091877 A1* | 3/2017 | Geis | G06Q 10/06 |
| 2017/0156258 A1* | 6/2017 | Reich | H04W 4/70 |
| 2017/0188087 A1* | 6/2017 | Kyoun | G06F 13/14 |
| 2017/0248946 A1* | 8/2017 | Ogura | A01B 69/00 |
| 2017/0350502 A1* | 12/2017 | Lee | F16H 63/304 |
| 2019/0101931 A1* | 4/2019 | Ogura | G05D 1/0022 |
| 2020/0060060 A1* | 2/2020 | Bassett | A01C 7/205 |

OTHER PUBLICATIONS

Utility U.S. Appl. No. 14/775,123, filed Sep. 11, 2015.

Communication pursuant to Article 94(3) EPC dated May 13, 2019 received in connection with EP Patent Application No. 16795474.2; 14 pages.

International Search Report and Written Opinion dated Jan. 24, 2017 in connection with PCT/US2016/059127, 15 pgs.

\* cited by examiner

MONITORING AND CONTROL DISPLAY SYSTEM AND METHOD USING MULTIPLE DISPLAYS IN A WORK ENVIRONMENT

TECHNICAL FIELD

The present invention relates generally to the control and operation of complex machinery and, more particularly, to using a simplified and personalized main display in combination with one or more auxiliary displays to control and operate complex machinery.

BACKGROUND OF THE INVENTION

The control of sophisticated and complex machinery in a simplified system for display is of paramount importance. When an operator of a complex machine (e.g., a farm tractor) needs to control multiple features and function of the device, that operator is often confronted with information and/or technical overload. For example, in farm tractors, there are typically independent critical systems and independent interfaces for the tractor and also for an implement and/or attachment of the tractor performing work functions. These multiple systems often include independent monitoring capabilities. In other words, a first display may be tied to the tractor GPS navigation positioning, a second display may display liquid dispensing information, a third display shows the planter controls and a fourth, the tractor steering controls. As such, there are four different displays each one of which controls a product, monitors material flow, monitors the tubes for distributing seed/inputs, or displays various selected camera views.

The sheer quantity of consoles is not only difficult and confusing to use, but can also block the operator's critical view outside the tractor cab. Moreover, when an operator wants to make an adjustment he/she has to decide which console to touch or which button to touch. Instantaneous decision making also involves typical questions like "how do I change that parameter or address that problem?" or "how do I access the right information to change the parameter?" Often each display is too complicated or too inadequate to quickly address these questions.

One solution to the above-described challenge for the control of sophisticated and complex machinery is described in U.S. patent application Ser. No. 14/775,123 by D. Markov et al. which describes a method and system for controlling a display in a machine operating in a work area whereby a plurality of views are displayed on a screen, each of the plurality of views corresponding to a plurality of functions. In this system, a user of the machine is allowed to simultaneously monitor the work area and control one or more of a plurality of functions by way of one or more of the plurality of views on a single display. Illustratively, the functions include one or more activities performed by an implement, connected to the machine, in the work area. The user is allowed to control, via the display, the one or more physical activities while monitoring the work area and bring together all of the information shown by multiple monitors into a single display.

As will be appreciated, in the course of operating these complex machines, it may be necessary for the operator of the machine to communicate in real-time with another individual that is proximally located to the machine but in an external location to the machine. For example, the operator may be inside the cab of a tractor and controlling, via the display, one or more physical activities while monitoring the work area and bringing together all of the information shown by multiple monitors into a single display inside the cab. However, it may be necessary or otherwise useful to have that information available to another individual that is outside the tractor, for example, monitoring a tank installed on the tractor. In this way action may be taken by the second individual external to the cab thereby allowing the operator to stay in the cab while the particular action is completed. Further, trends in the industry are moving toward so-called "bring your own device" (BYOD) architectures where individuals utilize their own personal mobile phones and/or tablets in their work areas and control machinery therein using such devices.

Therefore, a need exists for an improved technique for the distribution and presentation of individual elements of a user interface on a main device and a plurality of auxiliary devices.

BRIEF SUMMARY OF THE EMBODIMENTS

In accordance with various embodiments, a method and system is provided for the distribution and presentation of individual elements of a user interface on a main device and a plurality of auxiliary devices thereby maintaining a consistent user experience across all devices.

In accordance with an embodiment, a user of a machine (e.g., agricultural equipment such as a tractor) is able to bring together all of the information, for a particular work environment, shown by multiple monitors into a single display which facilitates the presentation of information in a manner that enables the user to easily navigate from one function set to another without undue inconvenience and share with one or more other users. The configuration of the main device and associated display is driven by a multi-display engine that facilitates the selection and display of different elements of the user interface (e.g., the plurality of views) on a plurality of auxiliary devices having a plurality of displays. The auxiliary devices with their associated displays may be located on or proximal to the particular machine and/or located at some other remote location (i.e., not proximal) defined by the work environment, and the auxiliary displays are independent of any sensors or other data collection devices associated with the machine that are monitoring the plurality of functions, for example.

In accordance with an embodiment, a main terminal has a display configured to define a plurality of views for display, each of the plurality of views corresponding to a plurality of functions and each view of the plurality of views being individually selectable for an independent display on one or more auxiliary displays. In addition to the plurality of views, in accordance with further embodiments, other user interface elements may also be individually selected and displayed on the auxiliary devices such as: mini-views, full size views, message windows, dialog windows, rate control panels, calibration panels and/or dashboard panels, to name just a few.

In accordance with an embodiment, the user is able to personalize all the above noted elements on a single main display in a flexible and user friendly configuration with a minimum amount of effort, and facilitate the sharing of the aggregated information (i.e., the plurality of views for display, each of the plurality of views corresponding to a plurality of functions) through the independent selection of one or more of the views for transmission to and display by at least one auxiliary display. As such, the various embodiments allow for the definition of a so-called distributed display network ("DDN") that facilitates the selection and presentation of individual elements of the user interface on the main device and different auxiliary devices (and associated displays).

In accordance with a further embodiment, a second user (e.g., not primarily responsible for operating the machine per se) and located, for example, external to the machine may select a desired user interface element or elements for transmission from the main display to the auxiliary display. That is, the user of the auxiliary device (and associated display) is able to choose which parts of the user interface (as defined in the main display) are to be viewable and useable on the auxiliary device. This selected element may also remain simultaneously viewable on the main device in accordance with the embodiment.

These and other advantages of the embodiments will be apparent to those of ordinary skill in the art by reference to the following detailed description and the accompanying drawings.

DETAILED DESCRIPTION

In accordance with various embodiments, a method and system is provided for the distribution and presentation of individual elements of a user interface on a main device and a plurality of auxiliary devices thereby maintaining a consistent user experience across all devices.

As noted above, U.S. patent application Ser. No. 14/775,123 by D. Markov et al. (hereinafter the "Markov Application"), which is hereby incorporated by reference for all purposes, describes a method and system for controlling a display in a machine operating in a work area whereby a plurality of views are displayed on a screen with each of the plurality of views corresponding to a plurality of functions. To further the understanding of the instant disclosure, the Markov Application will be next discussed in certain detail but it will be understood that the principles of the disclosed embodiments may be utilized in any system and architecture providing, in accordance the embodiments herein, for the distribution and presentation of individual elements of a user interface on a main device and a plurality of auxiliary devices thereby maintaining a consistent user experience across all devices.

Figure 1A:
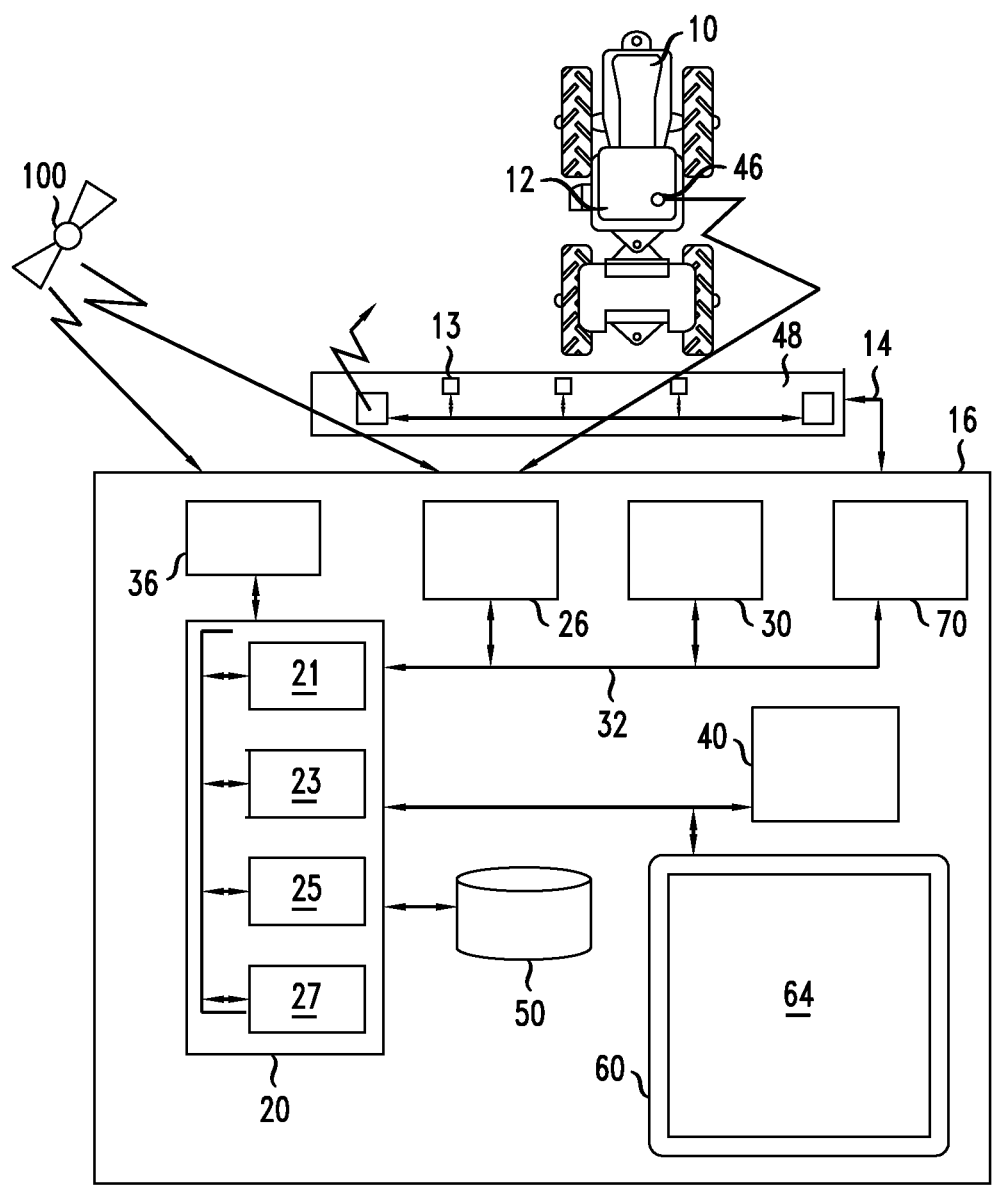
FIG. 1A shows a schematic diagram of a control system.

FIG. 1A is a schematic diagram of a control system according to the Markov Application and shows a control system 16 for controlling an agricultural machine system 10 (e.g., a tractor). Implementation in an agricultural machine system 10 (hereinafter referred to as tractor 10) operating on a given land territory is shown. The mode of operation of tractor 10 is well-known to one of ordinary skill and need not be discussed in further detail herein.

As shown the tractor 10 includes the control system 16, which is typically installed in the tractor cab 12. The control system 16 is adapted to receive signals via connected bus or other transmission lines 14 to an implement 48 attached to the tractor 10. The tractor 10 can also incorporate a plurality of sensors (not shown) each of which are adapted to communicate via appropriate electrical connections, or wirelessly through antenna 46 or by other wireless means as is conventionally known. The sensors provide a plurality of control and feedback functions, including but not limited to, drive control, position control, implement control, feed level monitoring, spray control, camera images, camera positioning, reference line control, etc.

The sensors and device controllers receive and transmit control information through electrical connections to input/output unit 70, or wirelessly through receiver and transmitter 26 and 30 respectively. Control signals are processed in a conventionally known manner and are communicated via bus 32 to central control unit 20. The control unit can comprise a microprocessor and a dedicated processor which operate on or in conjunction with modules 21, 23, 25 and 27. Each module can consist of software, or programmed logic in a hardware device or some other form of dedicated controller device. The module 21 is a route control module which communicates with an external positioning controller 36 to receive and process GPS signals from satellite 100 or satellite groups (not shown).

Module 23 is a specialized module for handling and processing signals from sensor array 13 signals. The use of a specialized module 23 is critical for high bandwidth high speed processing. For example if sensor 13 provides live camera feed, module 23 processes received camera signals, and processes feedback control information in real time (e.g. position, zoom) for dedicated device controllers (not shown) on tractor 10. Module 25 comprises the CPU which is adapted to perform numerous control tasks. Module 27 is a dedicated display control program or processor which interacts with touch display 60 and provides unique interactive control information on screen 64.

Drive control information is handled by drive controller 40 which interacts with control unit 20 to provide control feedback via connected or wireless signals to sensors and controller devices on the tractor 10 and the implement 48. The drive controller 40 is responsible for automatic drive control operations which enable the tractor to perform precise route movement based on information from the position controller 36. Position, drive, control and all other information can be stored in a memory (not shown) in the central controller 20, or in an attached memory device 50.

Figure 1B:
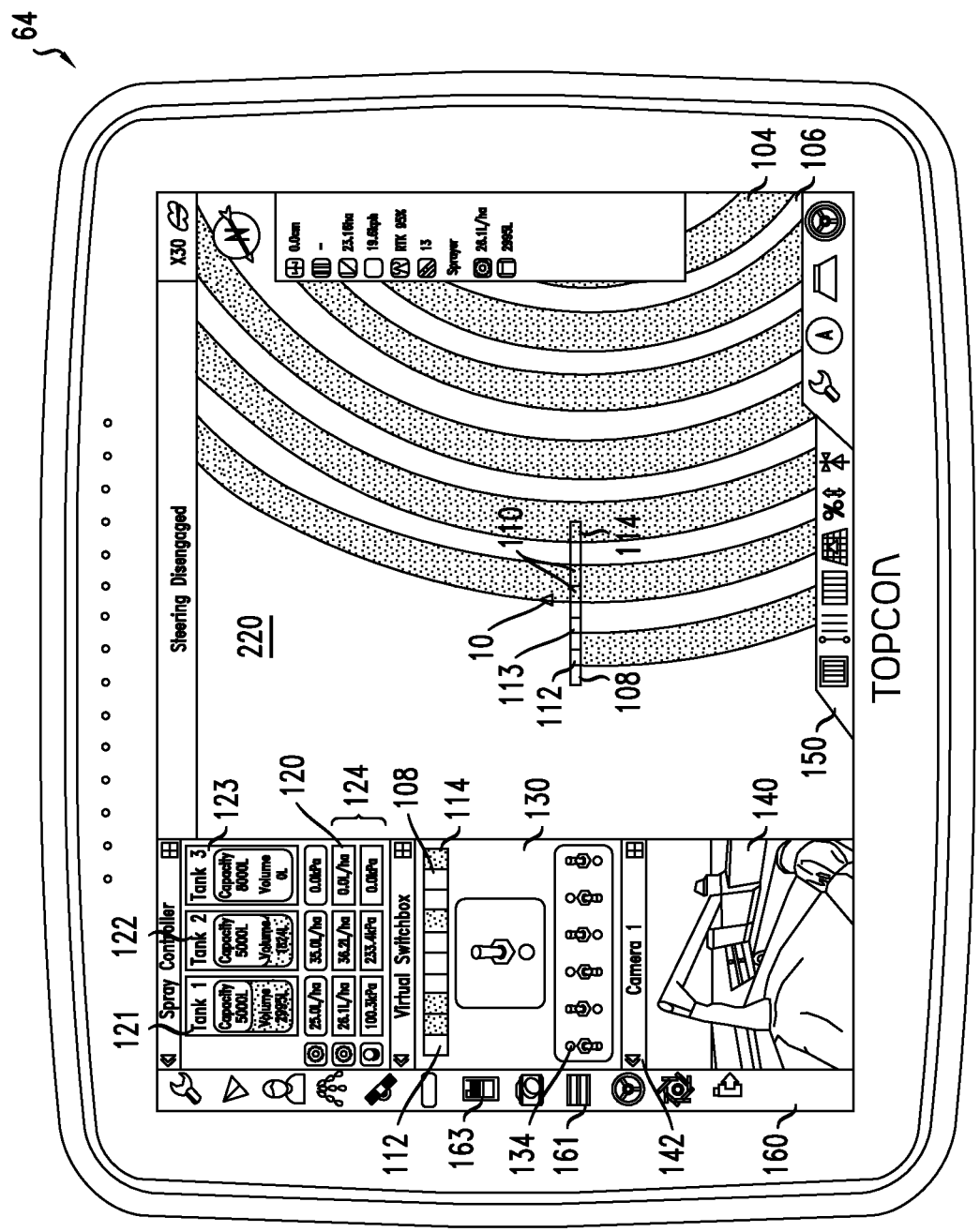
FIG. 1B shows a display with full open mini-views and toolbars.

FIG. 1B illustrates a display with full open mini-views and toolbars in accordance with the Markov Application. For example, FIG. 1B shows the screen 64 for a vehicle, such as tractor 10. In FIG. 1B, the tractor 10 is represented by a triangle, operating in a field using section control through a GPS device. The area/section 104 is where vehicle implement 48 or toolbar 108 puts down materials and the area/section 106 is where the implement 48 or toolbar 108 skips, i.e. does not put down material. A tool bar 108 is shown located behind the tractor 10. The toolbar includes a graphical representation of multiple tool areas $108_{1-n}$, such as spray heads, each of which could be colored on the display to represent a current state of operation. The tool bar control arrangement is similar to implement 48 shown in FIG. 1A. Specifically, certain areas of toolbar 108 show active tool zones 112, while other inactive areas 113 also are shown. In addition, areas of overlap 110 can be shown in a contrasting color. Certain areas of overlap can also represent a portion of a covered area 104, such as shown by a distinctly colored section 114 which for example, overlaps the area where material (e.g. seed, fertilizer) was previously spread.

On the far left of screen 64 are three mini-views 120, 130 and 140. The top mini-view area 120 is the spray controller display where three tanks 121-123 are shown. The tanks respectively are displayed with multiple related operational parameters that are measured by an on-board sensor, as is known in the industry. In the exemplified mini-view the following parameters are displayed in area 124: liters per hour, liters per minute, and the bar pressure readings for each respective tank 121-123. More details regarding mini-view 120 will be described below.

A second mini-view area 130 displays a virtual switch box that shows the operational status of the toolbar 108; for example, which sprayer is turned on and which sprayer is turned off. If a user were to touch individual switches 134 in mini-view 130, the individual switch would change the sprayer mode instantly. So if a user were to touch one of the switches 134, the dispenser would promptly turn on in toolbar area 112 and then the tractor 10 would start dispensing materials at that particular section 104. Meanwhile the switch color changes to reflect the new operational state.

Toolbar 108 and its respective work areas are replicated in the mini-view 130 above the virtual switchbox. The purpose of the repetitive view is to enable an operator to easily align toolbar area status with respective control switches. As a result, the operator can make precise alignments both between switches and tool areas, and also see evidence of the tool status change along rows 104 and 106 in the implement work area 220. All of these views are shown on one page of one display. Moreover, fingertip controls can affect large working areas with ease. For example, if the tool bar 108 is forty feet wide and there are ten sections $108_{1-10}$, each section 104, 106 could be four feet long and can respectively handle two individual load units (as shown by 114) that are each two feet in width for each section and could each be performing different tasks. So an operator can overlap half of section 104 while leaving the other half unaffected or treated with a different material. The user can thus intentionally overspray or double seed area 114 without resorting to complex multi-screen monitoring of the affected areas.

The third mini-view 140 represents a camera view 142 (entitled camera #1). The importance of the camera relates to being able to observe many types of equipment, particularly where size is significant. For example, if a rolling bin of seed (part of the implement 48) is pulled by the tractor 10, a camera would be essential since it would be difficult for the operator to see into a bin that is 60 feet behind the tractor cab. Moreover, even if a physical view were feasible, the user would still be required to stop the tractor in order to physically turn around to make a detailed observation of the seed bin. With a camera, the user can still look and see when they have to fill up the tender bin and then take it with them without stopping the tractor. Use of a camera allows the user to relate the progressive controls on screen information with the actual state of the equipment to access proper normal operation during the course of a specific job.

As shown, the onboard control capabilities are designed to handle multiple systems at once. For example, the tractor 10 and the implement 48 may be a multiple product dispensing liquid fertilizer device, or the implement 48 may be putting down a combination of fertilizers and different herbicides while also planting seeds into the ground. Because of the way the tractor 10 transfers the seed from the tender bin up to the areas that are planting them, there may be fans for blowing the seed and operating parameters associated with controlling the speed of those fans.

The mini-view arrangement enables the operator of a complex machine to view multiple complex functions on a single screen and to monitor work area 220 (i.e., the field of operation) simultaneously. As a result, the work of multiple displays, each dedicated to the function represented by a single mini-view, is avoided. More critically, the user can control each mini-view and thus each respective function easily without losing the fine tuning capabilities typically associated with a dedicated monitor with a minimum of interruption and thus a minimum of error. As such, the mini-views can be arranged and personalized by each operator in a flexible and simple manner. Any machine tool function can be shown in the mini-view format for any type of complex device requiring a screen monitor for operation.

Referring back to FIG. 1B, to the left of the mini-views, there is the single vertical bar that displays tool icons 160 which are used in conjunction with the various mini-views. For example, system diagnostics icon 161 is selectable to show the machine's work progress. A user, for example, may want to understand how much work area 220 the implement 48 is covering and how much area remains to be covered; to this end, job statistics as shown by icon 163 are made available on the screen when selected.

In addition to using camera one, the user can also switch to another camera by pressing on the camera bar 142. Then the camera mini-view 140 can be closed because the rate control shown in mini-view 120 for example needs to be adjusted. It should also be noted that a user can also assign priority of viewing for the mini-views upon setup. Automatic modes may be enabled allowing various views to be viewable on the main screen, on a regular timed interval, or based upon other operations specific parameters such as progress of the job, nearing the end of a particular job, anticipatory view prior to requiring an in-field turn, etc.

The bottom area of screen 64 functions as a "dashboard" or viewable area 150, where selected operating parameters can be displayed and monitored. This dashboard can be located on any available side of the display area. Unique aspects of the dashboard 150 allow for the user to determine which functions they would like to view through selection. Once selected, the parameter remains in view during normal operation allowing the machine operator to view it at a glance. The dashboard provides separate functionality from the mini-views. For example, adjustments on the bottom dashboard 150 can be dedicated to engaging or disengaging the steering, and engaging/disengaging the coverage maps, or changing the view of the map.

As such, the display system described in the Markov Application provides for controlling a display in a machine operating in a work area whereby a plurality of views are displayed on a screen, each of the plurality of views corresponding to a plurality of functions. The user is allowed to control, via the single display, the one or more physical activities while monitoring the work area and bring together all of the information shown by multiple monitors into a single display.

However, as noted above, in the course of operating these complex machines (e.g., agricultural machines), it may be necessary for the operator of the machine to communicate in real-time with another individual that is proximally located to the machine but in an external location to the machine. For example, the operator may be inside the cab of a tractor (e.g., tractor 10) and controlling, via the display, one or more physical activities while monitoring the work area (e.g., work area 220) and bringing together all of the information shown by multiple monitors into a single display inside the cab. As such, it may be necessary or otherwise useful to have that information available to another individual that is outside the tractor, for example, monitoring a tank installed on the tractor.

In accordance with various embodiments herein, a method and system is provided for the distribution and presentation of individual elements of a user interface on a main device and a plurality of auxiliary devices thereby maintaining a consistent user experience across all devices. Advantageously, the display system delivered by the disclosed embodiments allow for the use of multiple displays which show specific categorical information to a user "at a glance" and in the form factor and the location that is most suitable for that user's needs and requirements. The multiple displays have a common "look and feel" to enable a consistent user experience across all devices (and reduce the amount of training time needed, for example) and enables a BYOD environment. As such, in terms of BYOD, the various embodiments herein may take advantage (e.g., in assisting with operation of the machine under control) of the embedded functionality of these devices such as input sensors, cameras, near-field communication (NFC), and cellular capabilities, to name just a few. Further, the distributed display network allows for the performance of tasks inside and/or outside of the particular machinery by the main operator and other individuals but all through unified system architecture.

More particularly, in accordance with an embodiment, a user of a machine (e.g., agricultural equipment such as a tractor) is able to bring together all of the information, for a particular work environment, shown by multiple monitors into a single display which facilitates the presentation of information in a manner that enables the user to easily navigate from one function set to another without undue inconvenience and share with one or more other users. The configuration of the main device and associated display is driven by a multi-display engine that facilitates the display of different parts of the user interface (e.g., the plurality of views) on a plurality of auxiliary devices having a plurality of displays. The auxiliary displays may be located on or proximal to the particular machine and/or located at some other remote location (i.e., not proximal but at some marked distance away) defined by the work environment, and the auxiliary displays are independent of any sensors or other data collection devices associated with the machine that are monitoring the plurality of functions, for example.

Figure 2:
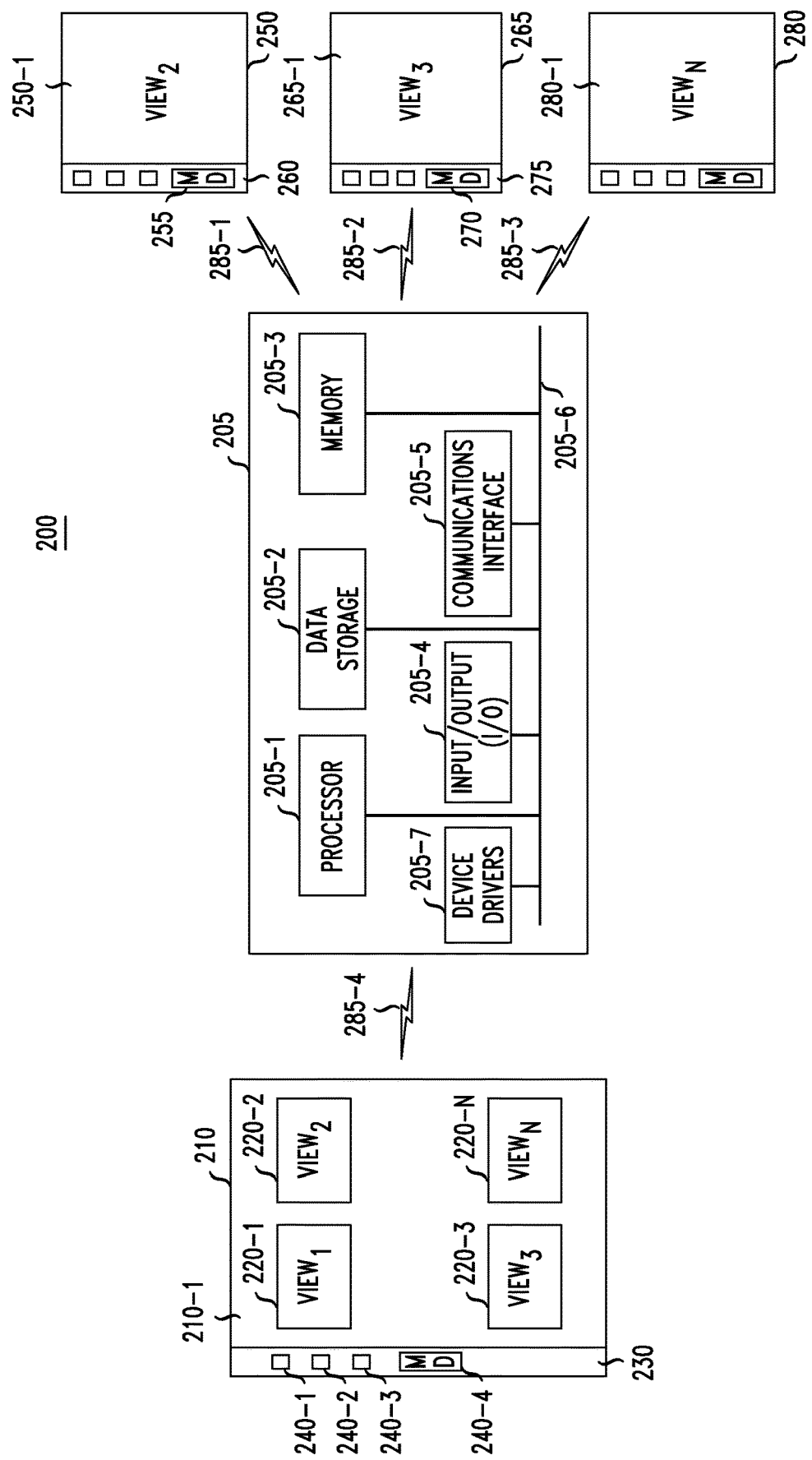
FIG. 2 shows a high-level block diagram of a display system in accordance with an embodiment.

FIG. 2 shows a high-level block diagram of display system 200 in accordance with an embodiment having multi-display engine 205, and main device 210 having display 210-1 configured to define a plurality of views, i.e., views 220-1, 220-2, 220-3, and 220-N, respectively, for display. Each of the plurality of views (i.e., user interface elements) correspond to a plurality of functions (as detailed above) and each view of the plurality of views are individually selectable for an independent display on one or more auxiliary displays (e.g., auxiliary display 250-1, auxiliary display 265-1, and auxiliary display 280-1 on auxiliary devices 250, 265, and 280, respectively). For example, views 220-1, 220-2, and 220-3 might be generated as set for above and correspond to mini-views 120, 130, and 140, respectively. The auxiliary devices may be located on or proximal to a particular machine (not shown) and/or located at some other remote location defined by the work environment, and the auxiliary displays (e.g., auxiliary display 250-1, auxiliary display 265-1, and auxiliary display 280-1) are independent of any sensors or other data collection devices associated with the machine that are monitoring the plurality of functions.

That is, auxiliary displays 250, 265, and 280, respectively, are dependent upon main display 210 in terms of content to display from the plurality of views 220-1 through 220-N which is selected by a user from main display 210-1 and transmitted to such auxiliary displays. For example, main display 210-1 might be mounted inside the cabin of a tractor (e.g., tractor 10) and accessible to the operator inside the tractor while auxiliary display 250-1 might be mounted on the tractor external to the cabin (e.g., on the backend of the tractor) and accessible by another individual working in the same work environment together with the tractor's operator. In another embodiment, main display 210-1 may be associated with one machine traversing the work area and auxiliary display 250-1 may be associated with another second machine traversing the work area whereby the operator of the second machine utilizes auxiliary display 250-1 to monitor the operation of the other machine (e.g., monitoring a coverage map as the selected user interface element). In still another embodiment, an owner of the work area (e.g., a farm owner) may use the plurality of auxiliary displays (e.g., auxiliary display 250-1, auxiliary display 265-1, and auxiliary display 280-1) from a particular structure associated with the work area (e.g., a barn) to monitor the plurality of machines (with each such machine having its own respective main display 210-1) which may be located across one or more fields of the work area.

In accordance with the embodiment, by and through multi-display engine 205, the user is able to personalize all the above noted user interface elements from main device 210 on main display 210-1 in a flexible and user friendly configuration easily and with a minimum amount of effort, and facilitate the sharing of the aggregated information (i.e., the plurality of views 220-1 through 220-N for display, each of the plurality of views corresponding to a plurality of functions, as detailed herein above) through the independent selection of one or more of the views for transmission to and display by one or more of auxiliary devices 250, 265, and 280. Illustratively, the selection may be made by enabling the multi-display system through selecting icon 240-4 of the plurality of icons 240-1, 240-2, 240-3, and 240-4 shown on toolbar 230. For example, main display 210-1 might include well-known touch sensitivity thereby allowing the user to simply tap icon 220-4 to execute the desired action. As will be appreciated, while multi-display engine 205 is shown as a separate device in FIG. 2, the functionality of multi-display engine 205 may be fully incorporated and integrated into main device 210 in accordance with principles of the embodiments herein.

Multi-display engine 205 comprises processor 205-1 operatively coupled to a data storage device 205-2 and a memory 205-3. Processor 205-1 controls the overall operation of multi-display engine 205 by executing computer program instructions that define such operations. Communications bus 205-6 facilitates the coupling and communication between the various components of multi-display engine 205. The computer program instructions may be stored in data storage device 205-2, or a non-transitory computer readable medium, and loaded into memory 205-3 when execution of the computer program instructions is desired. Thus, the steps of the disclosed method (see, e.g., FIGS. 4 and 5, and the associated discussion herein below) can be defined by the computer program instructions stored in memory 205-3 and/or data storage device 205-2 and controlled by processor 205-1 executing the computer program instructions. For example, the computer program instructions can be implemented as computer executable code programmed by one skilled in the art to perform the illustrative operations defined by the disclosed method. Accordingly, by executing the computer program instructions, processor 205-1 executes an algorithm defined by the disclosed method. Multi-display engine 205 also includes one or more communication interfaces 205-5 for communicating with other devices via a network (e.g., a wireless communications network) or communications protocol (e.g., Bluetooth®). For example, such communication interfaces may be a receiver, transceiver or modem for exchanging wired or wireless communications in any number of well-known fashions. Multi-display engine 205 also includes one or more input/output devices 205-4 that enable user interaction with multi-display engine 205 (e.g., camera, display, keyboard, mouse, speakers, microphone, buttons, etc.).

Processor 205-1 may include both general and special purpose microprocessors, and may be the sole processor or one of multiple processors of multi-display device 205. Processor 205-1 may comprise one or more central processing units (CPUs), for example. Processor 205-1, data storage device 205-2, and/or memory 205-3 may include, be supplemented by, or incorporated in, one or more application-specific integrated circuits (ASICs) and/or one or more field programmable gate arrays (FPGAs).

Data storage device 205-2 and memory 205-3 each comprise a tangible non-transitory computer readable storage medium. Data storage device 205-2, and memory 205-3, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 205-4 may include peripherals, such as a camera, printer, scanner, thumb-drive, etc. Device drivers 205-7 contains a plurality of device drivers useful in facilitating interactions (e.g., display) by and between main device 210, main display 210-1, auxiliary device 250, auxiliary display 250-1, auxiliary device 265, auxiliary display 265-1, auxiliary device 280, and auxiliary display 280-1, for example.

The transmissions between multi-display engine 205, main device 210 and auxiliary devices 250, 265, 280, respectively, being made over communication links 285-1, 285-2, 285-3, and/or 285-4 which are, illustratively, wireless communications links established over wireless infrastructure, such as a third party supplied cellular or Wi-Fi network. Alternatively, in cases where an existing third party wireless infrastructure does not exist, the user must provide a suitable replacement. In such cases, one type of a user supplied infrastructure configuration is a narrowband single frequency radio system that may be operated over the particular work environment, for example. Such communication is realized with, for example, Wi-Fi radios as well as cellular phones (e.g., 3G/4G/LTE/5G), UHF radios and/or solid state radios.

In accordance with a further embodiment, a second user (e.g., not responsible for operating the machine per se) and located, for example, external to the machine may select a desired view or views for transmission from main display 210-1 to one of auxiliary display 250-1, auxiliary display 265-1 and/or auxiliary display 280-1. Illustratively, as shown in FIG. 2, the selection may be made by enabling the multi-display system through selecting icon 255 of the plurality of icons shown on toolbar 260 and identifying that view 220-2 is to be provided, transmitted and displayed from auxiliary display 250-1, and another selection may be made using icon 270 of the plurality of icons shown on toolbar 275 and identifying that view 220-3 is to be transmitted to and displayed by auxiliary display 265. These selection(s) are all made from the respective auxiliary display of the auxiliary device used by the user, and the control and operation of the particular machine is undertaken according to such selections made by and through the display system.

With regard to agricultural machinery, for example, embodiments herein can be incorporated into self-propelled combine harvesters, specialty crop harvesters, sprayers and tractors employing a variety of implements including spreaders for fertilizer, planters of seed employing various methods of dispersion, various types of spraying devices, cutting edges, forage harvesters and swathers, to name a few. That said, the principles of the embodiments disclosed herein can be deployed with any type of machine as is conventionally known in the art which would benefit from having a display system providing the ability for the distribution and presentation of individual elements of a user interface on a main device and a plurality of auxiliary devices thereby maintaining a consistent user experience across all devices. For example, as detailed above, a main display configured to define a plurality of views, each of the plurality of views corresponding to a plurality of functions, and each view of the plurality of views being individually selectable for an independent display on one or more auxiliary displays.

Figure 3:
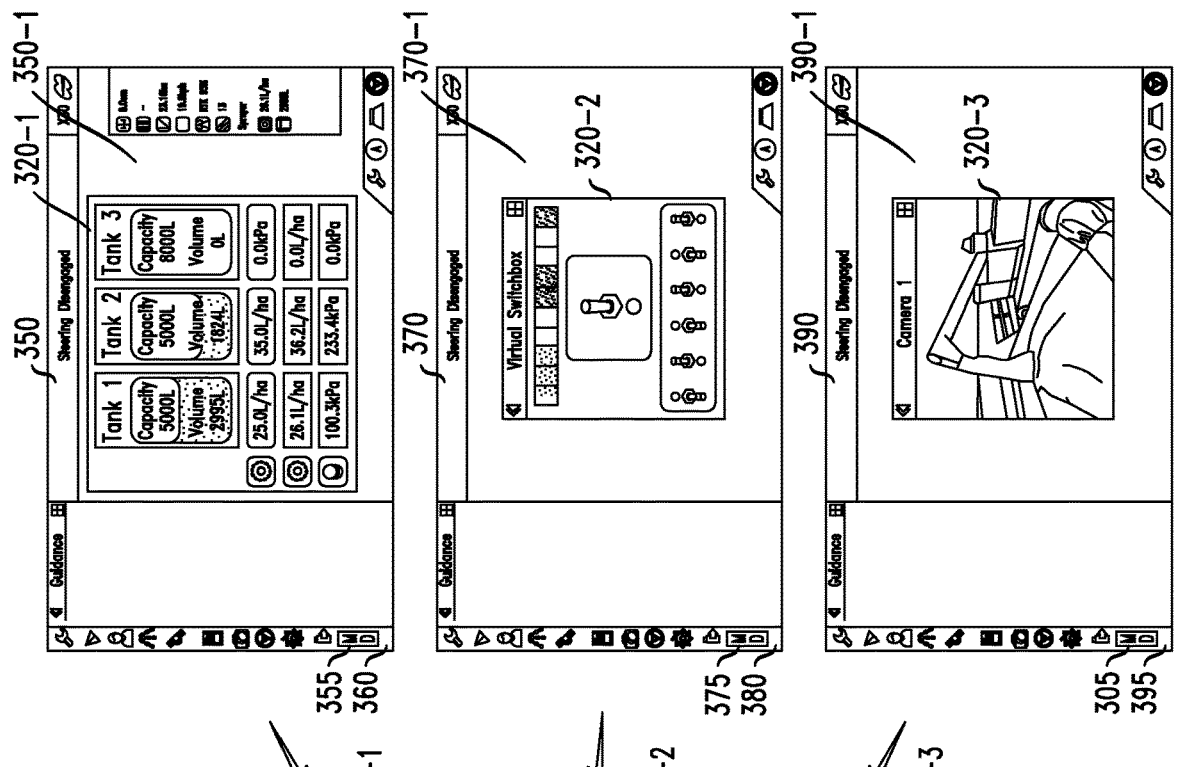
FIG. 3 shows an explanatory diagram of an agricultural application, in accordance with an embodiment, using a display system configured in accordance with FIG. 2.
Figure 3:
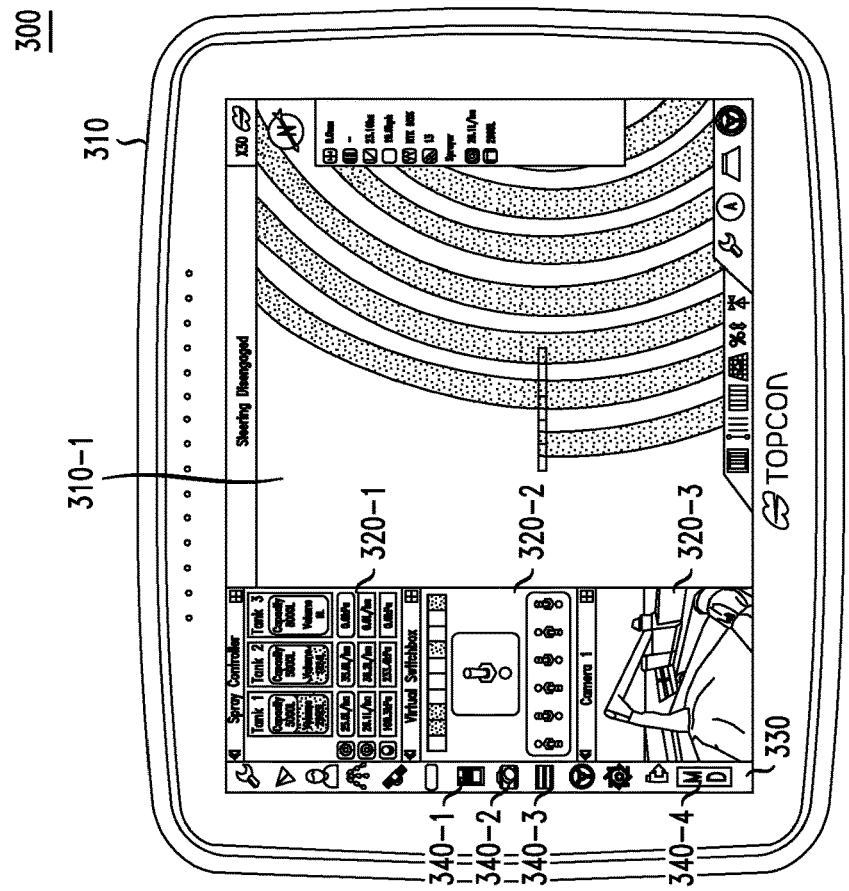

For example, FIG. 3 shows an explanatory diagram of an agricultural application, in accordance with an embodiment, using a display system configured in accordance with FIG. 2. As shown, display system 300 includes main device 310 having display 310-1 configured to define a plurality of views, i.e., views 320-1, 320-2, and 320-3, respectively, for display, each of the plurality of views corresponding to a plurality of functions (as detailed above) and each view of the plurality of views being individually selectable for an independent display on one or more auxiliary displays (i.e., auxiliary display 350-1, auxiliary display 370-1, and auxiliary display 390-1 resident on auxiliary devices 350, 370, and 390, respectively). As noted above, the multi-display engine (i.e., multi-display engine 205) and its functionality can be fully incorporated into the main display which is consistent with the embodiment shown in FIG. 3 where main device 310 includes an integrated multi-display engine 205 (not shown in FIG. 3).

As shown, views 320-1, 320-2, and 320-3 might be generated as set forth above and substantially correspond to mini-views 120, 130, and 140, respectively. The auxiliary devices and their associated displays may be located on or proximal to a particular machine (e.g., not shown) and/or located at some other remote location defined by the work area, and the auxiliary displays (e.g., auxiliary display 350-1, auxiliary display 370-1, and auxiliary display 390-1) are independent of any sensors or other data collection devices associated with the machine that are monitoring the plurality of functions. For example, main device 310 having main display 310-1 might be mounted inside the cabin of tractor and accessible to the operator inside the tractor while auxiliary device 350 having auxiliary display 350-1 might be mounted on the tractor external to the cabin (e.g., on the backend of the tractor) and accessible by another individual working in the same work area together with the tractor's operator.

In accordance with an embodiment, the user is able to personalize all the above noted elements on main display 310-1 in a flexible and user friendly configuration easily and with a minimum amount of effort, and facilitate the sharing of the aggregated information (i.e., the plurality of views 320-1 through 320-3 for display, each of the plurality of views corresponding to a plurality of functions, as detailed herein above) through the independent selection of one or more of the views for transmission to and display by one or more of auxiliary displays 350-1, 370-1, and 390-1. Illustratively, the selection may be made by enabling the multi-display system through selecting icon 340-4 of the plurality of icons 340-1, 340-2, 340-3, and 340-4 shown on toolbar 330.

The transmissions between main device 310 and auxiliary devices 350, 370, 390, respectively, being made over communication links 385-1, 385-2, and/or 385-3 which are, illustratively, a wireless communications link established over wireless infrastructure, such as a third party supplied cellular or Wi-Fi network as detailed herein above. It should be noted that while the present embodiment shows only three mini-views, other combinations are feasible. For example, a larger number of mini-views would be feasible with higher resolution display screens. A given machine such as a complex aircraft control display, or a harvester may require many mini-views, and those would be configurable by the manufacturer and/or individual operator as desired in accordance with principles of the embodiments described herein.

In accordance with a further embodiment, a second user (e.g., not responsible for operating the machine per se) and located, for example, external to the machine may select a desired view or views for transmission from main display 310-1 to one of auxiliary display 350-1, auxiliary display 370-1 and/or auxiliary display 390-1. Illustratively, as shown in FIG. 3, the selection may be made by enabling the multi-display system through selecting icon 355 of the plurality of icons shown on toolbar 360 and identifying that view 320-2 is to be transmitted to and displayed by auxiliary display 350. Another selection may be made using icon 375 of the plurality of icons shown on toolbar 380 and identifying that view 320-2 is to be provided, transmitted and displayed by auxiliary display 370-1. A further selection may be made using icon 305 of the plurality of icons shown on toolbar 395 and identifying that view 320-3 is to be provided, transmitted and displayed by auxiliary display 390-1. As such, in accordance with this embodiment, the second user will be monitoring the machine which may also include adjusting the operations of the machinery, modifying the work environment, or taking corrective action, to name just a few actions that may be undertaken from the selected view (from the main display) displayed on the auxiliary display.

As noted above, the embodiments described herein can be used in conjunction with control systems for any other types of complex machinery for agriculture, construction and other heavy industries. Examples include construction vehicles, ship or aircraft control systems, or even manufacturing or assembly lines where multiple views and parameters associated with the work area in which the complex machinery is operated are presented to the operator in an efficient and personalized configuration on a main display and one or more of the multiple views are individually selectable for transmission to and display on one or more auxiliary displays. It is noted that the work area can be any area in which the complex machinery operates such as land, sea, or air. The work area (or environment) is typically outside the complex machinery encompassing external devices, operations, personnel, areas, location and the like.

Figure 4:
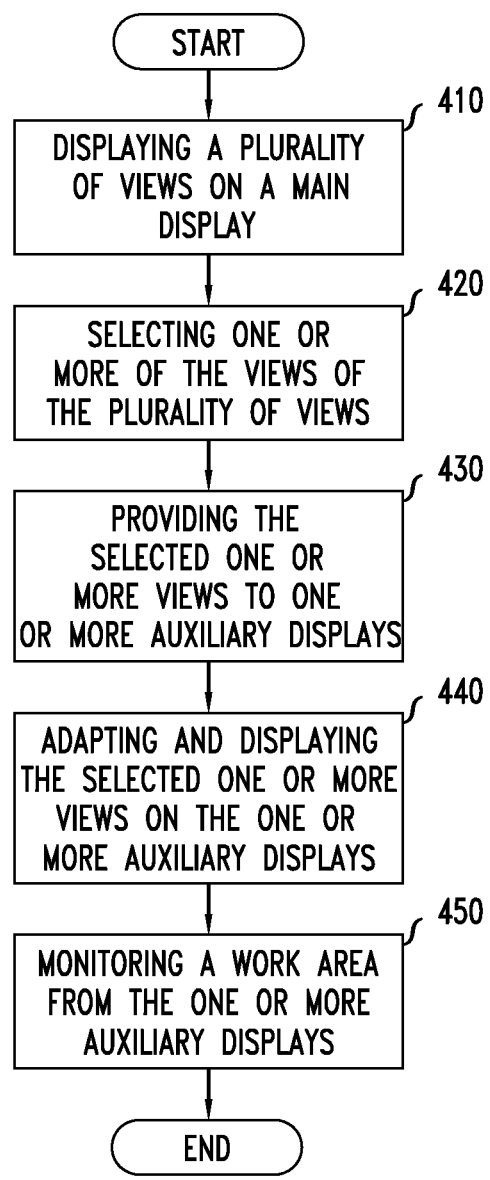
FIG. 4 shows a flowchart of illustrative operations for delivering a display system using multiple displays in a work environment in accordance with an embodiment.

FIG. 4 shows a flowchart of illustrative operations 400 for delivering a display system using multiple displays in a work environment in accordance with an embodiment. As shown in FIG. 4, at step 410, a plurality of views are displayed on a main display. As detailed herein above, each of the plurality of views corresponding to a plurality of functions and each view of the plurality of views being individually selectable for an independent display on one or more auxiliary displays. At step 420, one or more of the views shown on the main display (i.e., a first display) is selected and, at step 430, the selected one or more views is adapted and provided to one or more auxiliary displays (i.e., a second display, a third display, etc.). Then, at step 440, the selected one or more views is adapted and displayed on the one or more auxiliary displays and monitoring of the work area, at step 450, from the one or more auxiliary displays occurs as detailed above. That is, in accordance with the embodiment the selected view (i.e., the user interface element) adapts in real-time to the particular layout and appearance for best display and utilization on the particular auxiliary display. For example, such adaptations may include, but are not limited to, features such as screen resolution, size, and/or orientation (e.g., portrait or landscape). The monitoring may include adjusting the operations of the machinery, modifying the work environment, or taking corrective action, to name just a few possible actions that may be undertaken from the selected view (from the main display) displayed on the auxiliary display.

Figure 5:
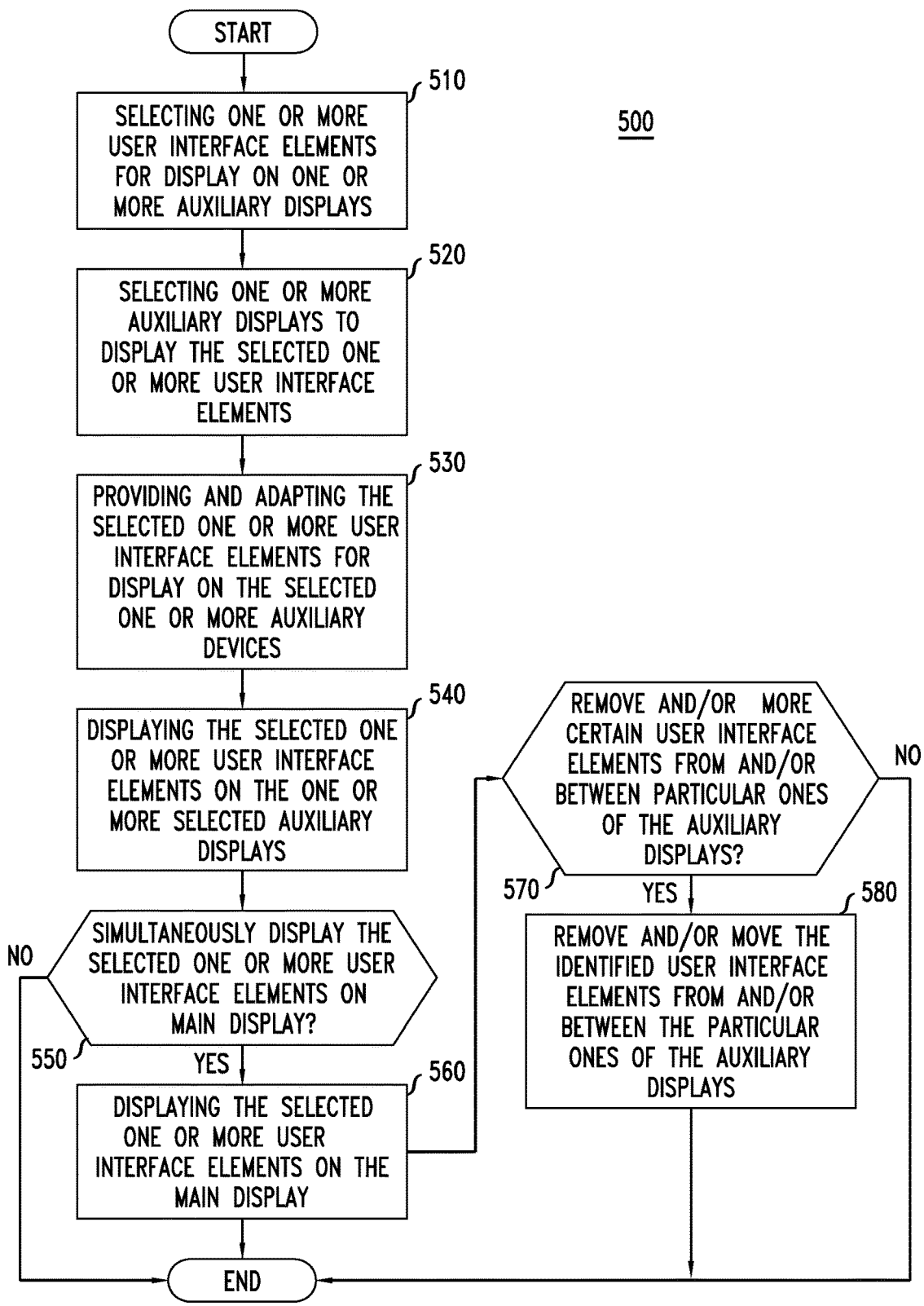
FIG. 5 shows a flowchart of illustrative operations for delivering a display system that allows for the distribution and presentation of individual elements of a user interface on a main device and a plurality of auxiliary devices in accordance with an embodiment.

FIG. 5 shows a flowchart of illustrative operations 500 for delivering a display system that allows for the distribution and presentation of individual user interface elements on a main device and a plurality of auxiliary devices in accordance with an embodiment. In particular, at step 510 the selection of one or more user interface elements for display on one or more auxiliary displays, illustratively, as detailed above by a user of particular piece of machinery (e.g., a tractor). As noted above, the user interface elements may be selected from a wide variety of elements such as mini-views, full size views, message windows, dialog windows, rate control panels (e.g., sprayer controllers, spreader controllers and seeder controllers), calibration panels (sprayer calibration, spreader calibration and seeder calibration) and/or dashboard panels (e.g., vehicle speed), to name just few, where such user interface elements may be individually and/or collectively selected and provided for separate display on auxiliary devices in accordance with various embodiments.

At step 520, a selection of one or more auxiliary displays to display the selected user interface elements is made. As noted above, the auxiliary displays are associated with a plurality of auxiliary devices that may include equipment consoles, wireless handsets, smart phones, tablets and the like. Once identified, the selected user interface elements are adapted and provided, at step 530, for display on the respective auxiliary display selected, and then displayed, at step 540, on the respective auxiliary display of the auxiliary device. That is, in accordance with the embodiment the selected user interface element adapts in real-time to the particular layout and appearance for best display and utilization on the particular auxiliary device and associated display. In certain situations, it may be beneficial to have the selected user interface elements simultaneously displayed, at steps 550 and 560, on both the main display (of the main device) and the auxiliary displays (of the auxiliary devices). Further, at steps 570 and 580, it may be beneficial in certain situation to remove and/or move certain user interface elements from and/or between particular ones of the auxiliary displays.

Advantageously, in accordance with the embodiment, the distribution and presentation of individual elements of a user interface on a main device and a plurality of auxiliary devices is facilitated thereby maintaining a consistent user experience across all devices which are platform agnostic. That is, the auxiliary devices can be a wide variety of standard devices and executing a variety of operating systems such as Linux®, Windows®, iOS® and Android™ to name just a few. For example, the auxiliary devices described herein might download and install, in a well-known manner, an available application program designed for interfacing and operating with the various display system embodiments described herein.

Figure 6:
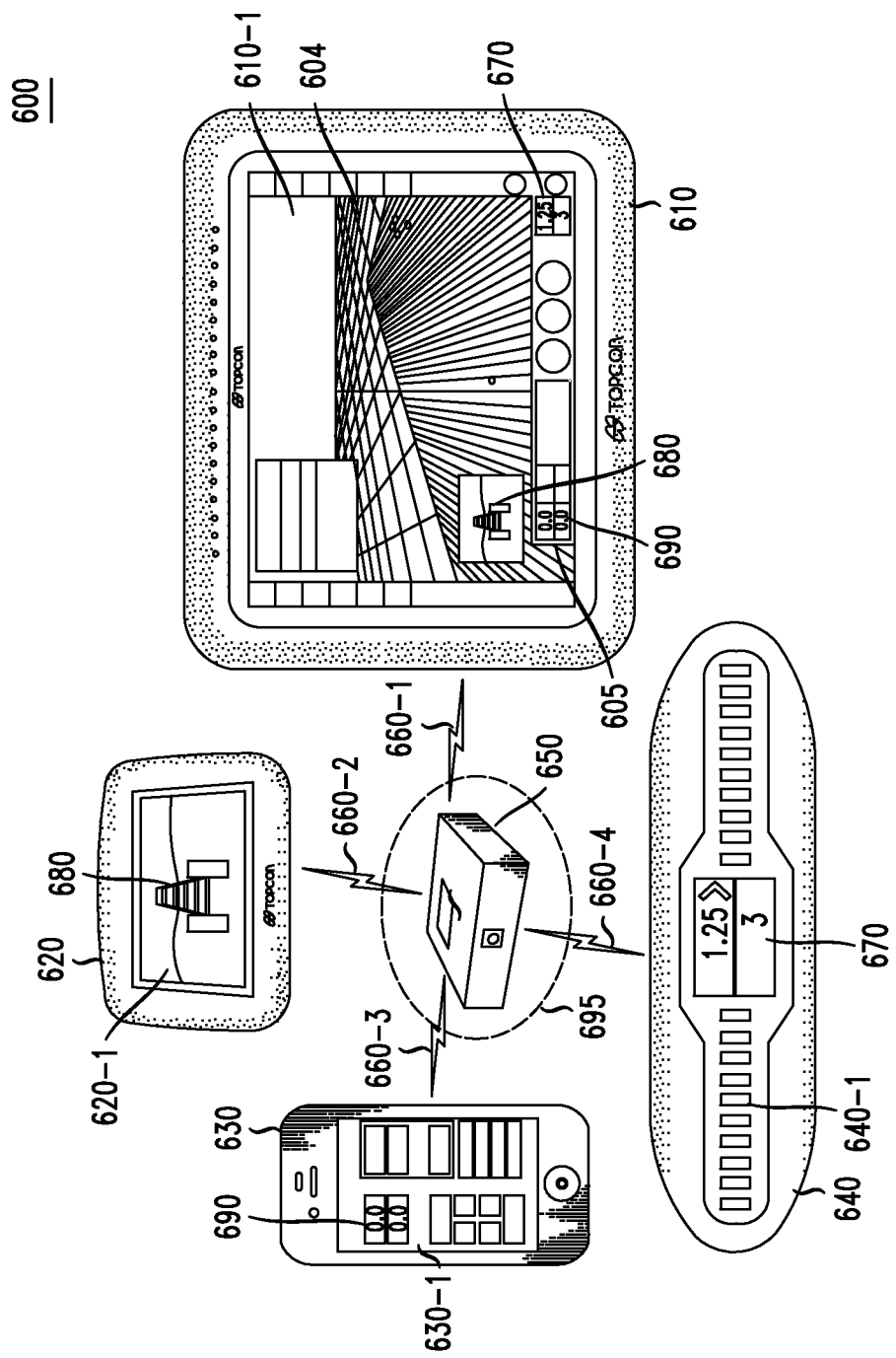
FIG. 6 shows an explanatory diagram of a display system configured in accordance with an embodiment utilizing a main device in combination with a plurality of auxiliary devices.

FIG. 6 shows an explanatory diagram 600 of a display system configured in accordance with an embodiment utilizing a main device in combination with a plurality of auxiliary devices. As shown, main device 610 having main display 610-1 which is, illustratively, a tractor main console, auxiliary device 620 having auxiliary display 620-1 which is, illustratively, small console display, auxiliary device 630 having auxiliary display 630-1 which is, illustratively, a smartphone, and auxiliary device 640 having auxiliary display 640-1 which is, illustratively, a light bar. As will be appreciated, the main and auxiliary devices and associated displays may include a wide variety of types such as machine console displays, light bars, iOS® devices, Android™ devices, heads-up displays, and wearable devices, to name just a few, and have no user input capability (i.e., display only) or a variety of user input capabilities such as touch screens, physical buttons and/or rotary knobs (i.e., encoders), to name just a few. The display devices may also have a variety of screen sizes, aspect ratios, screen resolutions and color depths in accordance with the various embodiments described herein.

Main device 610 and the plurality of auxiliary devices 620, 630, and 640 exchange communications with multi-display engine 650 (configured the same as multi-display engine 205 as shown in FIG. 2) over distributed display network 695 using communications links 660-1, 660-2, 660-3, and 660-4 (e.g., wireless communications links such as Wi-Fi and Bluetooth®, or wired communication links such as Ethernet or controller area network (CAN)). Illustratively, multi-display engine 650 is mounted at some convenient location inside the cabin (not shown) of the particular machine (e.g., beneath the driver's seat). Main device 610 delivers for the particular machine (not shown) the main user interface, navigation controls, setup screens, etc. and there is single such main device within the distributed display network 695. In contrast, the plurality of auxiliary devices 620, 630, and 640 shall display individual user interface (UI) elements (as selected by the user) but do not provide any navigational or other input controls to the machine apart from the specific ones existing within the particular UI element they are displaying at any particular time. As detailed above, main device 610 is located inside the cabin a particular machine (not shown) and accessible to the user of the machine, and the plurality of auxiliary devices 620, 630, and 640 may be located inside or outside (either proximally located and/or remotely located at some marked distance away) the cabin depending upon the particular work area and functions being undertaken.

In recognition of the flexibility facilitated by the various embodiments, a further embodiment allows for two different main displays to interoperate in accordance with the main display and auxiliary display features detailed herein above. That is, in accordance this embodiment, two main displays can be used whereby a particular user interface element on one main display is operative as an auxiliary display for another main display. For example, a user of main display 610-1 might open a mini-view (i.e., UI element 680) and in the mini-view show a view from another main display (not shown in FIG. 6) associated with a second (i.e., another, different) machine. In this way, in accordance with the embodiment, main display 610-1 now serves a dual function, that is, the main display for its associated machine (and functioning with the features of such a main display as detailed herein above) and as an auxiliary display for the other machine (and functioning with the features of such an auxiliary display as detailed herein above).

In accordance with the embodiment, there are three (3) user interface elements shown in FIG. 6, namely UI element 670 which is part of dashboard panel 605, UI element 680 which is a camera window showing select camera views from the particular piece of machinery (not shown), and UI element 690 which opens a calibration window to perform a particular function (e.g., seeder calibration). As shown, UI element 670 has been selected for display on auxiliary display 640-1, UI element 670 has been selected for display on auxiliary display 620-1, and UI element 690 has been selected for display on auxiliary display 630-1. As detailed above, in accordance with the embodiment, user interface elements 670, 680, and 690 each respectively adapts in real-time to the particular layout and appearance for best display and utilization on the particular auxiliary device and associated display (i.e., auxiliary displays 620-1, 630-1, and 640-1). The selection and display of these UI elements being facilitated by and through multi-display engine 650 and main display 610 as detailed above.

Advantageously, the display system delivered by the disclosed embodiments allow for the use of multiple displays which show specific categorical information to a user "at a glance" and in the form factor and the location that is most suitable for that user's needs and requirements. The multiple displays have a common "look and feel" to enable a consistent user experience across all devices (and reduce the amount of training time needed, for example) and enables a BYOD environment. As such, in terms of BYOD, the various embodiments herein may take advantage of the embedded functionality of these devices such as input sensors, cameras, near-field communication (NFC), and cellular capabilities, to name just a few. Further, the distributed display network allows for the performance of tasks inside and/or outside of the particular machinery by the main operator and other individuals but all through unified system architecture, and leverages and extends the capabilities of the distributed display network through the incorporation of a BYOD environment, as noted above.

Figure 7:
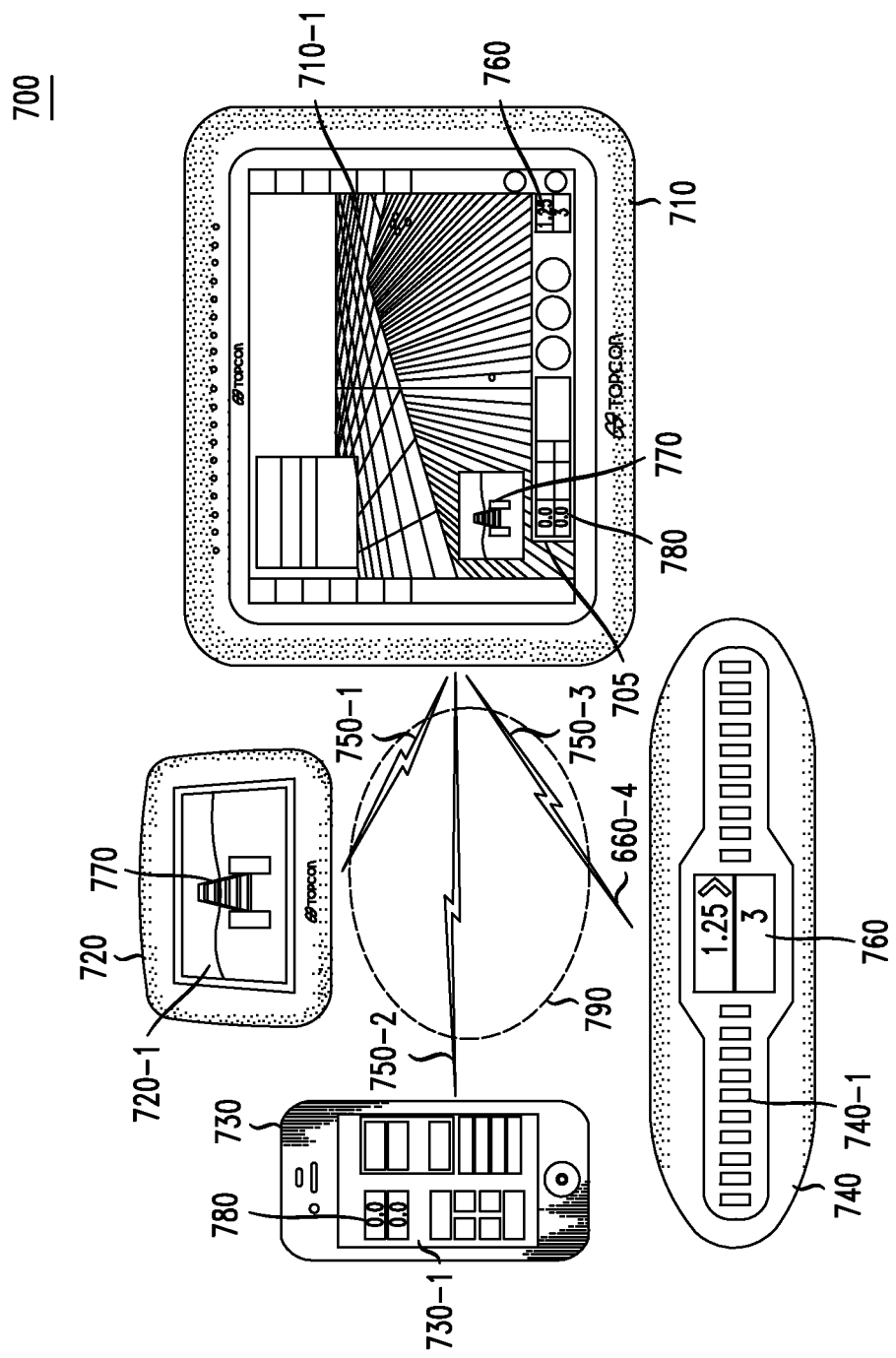
FIG. 7 shows an explanatory diagram of a display system configured in accordance with an embodiment utilizing a main device having a fully integrated multi-display engine in combination with a plurality of auxiliary devices.

As discussed above, in accordance with further embodiments, the multi-display engine may be fully incorporated within the main device to deliver to the display system. In particular, FIG. 7 shows an explanatory diagram 700 of a display system configured in accordance with an embodiment utilizing main device 710 which includes the multi-display engine integrated therein (e.g., multi-display engine 650 shown in FIG. 6) in combination with a plurality of auxiliary devices. As shown, main device 710 having main display 710-1 which is, illustratively, a tractor main console, auxiliary device 720 having auxiliary display 720-1 which is, illustratively, small console display, auxiliary device 730 having auxiliary display 730-1 which is, illustratively, a smartphone, and auxiliary device 740 having auxiliary display 740-1 which is, illustratively, a light bar.

Main device 710 and the plurality of auxiliary devices 720, 730, and 740 exchange communications facilitated by main device 710 (configured with integrated multi-display engine 205 as shown in FIG. 2) over distributed display network 790 using communications links 750-1, 750-2, and 750-3 (e.g., wireless communications links such as Wi-Fi and Bluetooth®, or wired communication links such as Ethernet or controller area network (CAN)). Illustratively, main device 710 is mounted at some convenient location inside the cabin (not shown) of the particular machine for ease of use and viewing by the operator (not shown). Main device 710 delivers for the particular machine (not shown) the main user interface, navigation controls, setup screens, etc. and there is single such main device within the distributed display network 790. In contrast, the plurality of auxiliary devices 720, 730, and 740 shall display individual user interface (UI) elements (as selected by the user) but do not provide any navigational or other input controls to the machine apart from the specific ones existing within the particular UI element they are displaying at any particular time. As detailed above, main device 710 is located inside the cabin a particular machine and accessible to the user of the machine, and the plurality of auxiliary devices 720, 730, and 740 may be located inside or outside the cabin depending upon the particular work area and functions being undertaken.

In accordance with embodiment, there are three (3) user interface elements shown in FIG. 7, namely UI element 760 which is part of dashboard panel 705, UI element 770 which is a camera window showing select camera views from the particular piece of machinery (not shown), and UI element 780 which opens a calibration window to perform a particular function (e.g., seeder calibration). As shown, UI element 760 has been selected for display on display 740-1, UI element 770 has been selected for display on display 720-1, and UI element 780 has been selected for display on display 730-1. The selection and display of these UI elements being facilitated by and through main device 710 (configured with multi-display engine 205) as detailed above. As detailed above, in accordance with the embodiment, user interface elements 760, 770, and 780 each respectively adapts in real-time to the particular layout and appearance for best display and utilization on the particular auxiliary device and associated display (i.e., auxiliary displays 720-1, 730-1, and 740-1).

It should be noted that for clarity of explanation, the illustrative embodiments described herein may be presented as comprising individual functional blocks or combinations of functional blocks. The functions these blocks represent may be provided through the use of either dedicated or shared hardware, including, but not limited to, hardware capable of executing software. Illustrative embodiments may comprise digital signal processor ("DSP") hardware and/or software performing the operation described herein. Thus, for example, it will be appreciated by those skilled in the art that the block diagrams herein represent conceptual views of illustrative functions, operations and/or circuitry of the principles described in the various embodiments herein. Similarly, it will be appreciated that any flowcharts, flow diagrams, state transition diagrams, pseudo code, program code and the like represent various processes which may be substantially represented in computer readable medium and so executed by a computer, machine or processor, whether or not such computer, machine or processor is explicitly shown. One skilled in the art will recognize that an implementation of an actual computer or computer system may have other structures and may contain other components as well, and that a high level representation of some of the components of such a computer is for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:
1. A method, the method comprising:
   displaying a plurality of views on a main display associated with a machine traversing a work area, each of the plurality of views corresponding to a plurality of functions for controlling the machine in the work area and particular ones of the plurality of functions being monitored by at least one sensor associated with the machine, and each view of the plurality of views being individually selectable, from the main display by a user of the machine, for independent display on one or more auxiliary displays, and the one or more auxiliary displays being independent of the at least one sensor associated with the machine and dependent upon the main display for content to display from the plurality of views;
   receiving a selection, from the main display, of a first view of the plurality of views, and a second view of the plurality of views;
   adapting, in real-time, the first view on a first one of the auxiliary displays for display thereon, and the second view on a second one of the auxiliary displays for display thereon, wherein the adapting of the first view is specific to a first layout and appearance for display and utilization on the first one of the auxiliary displays, and the adapting of the second view is specific to a second layout and appearance for display and utilization on the second one of the auxiliary displays;

providing simultaneously the first view to the first one of the auxiliary displays, and the second view to the second one of the auxiliary displays; and adjusting at least a first operation of the machine via the main display and adjusting at least a second operation of the machine based on the displaying of the first view on the first one of the auxiliary displays or the second view on the second one of the auxiliary displays, wherein the main display is mounted inside a cabin of the machine and wherein the first one of the auxiliary displays is located on the machine, and the second one of the auxiliary displays is located remotely away from the machine.

2. The method of claim 1 further comprising:

displaying simultaneously the first view on the first one of the auxiliary displays, and the second view of the plurality of views on the second one of the auxiliary displays, wherein the first view and the second view display different functions of the plurality of functions.

3. The method of claim 2 further comprising:

generating the plurality of views based on input from the user of the machine, and wherein the selection of the first view of the plurality of views, and the second view of the plurality of views is performed by the user.

4. The method of claim 1 wherein the first one of the auxiliary displays is void of any user input capability, and the second one of the auxiliary displays has a variety of user input capabilities.

5. The method of claim 1 wherein the machine is a tractor, and particular ones of the plurality of functions are associated with an implement connected to tractor, the particular ones of the plurality of functions comprising a physical activity performed by the implement.

6. The method of claim 1 further comprising:

receiving a selection, initiated from the first one of the auxiliary displays, of a particular one view of the plurality of views for display on the main display which is viewable and useable on the first one of the auxiliary displays.

7. A system for controlling a machine, the system comprising:

a processor;

a memory coupled with the processor, the memory having a program that stores computer program instructions that when executed cause the processor to perform operations for:

displaying a plurality of user interface elements on a main display associated with the machine traversing a work area, each of the plurality of user interface elements being associated with a particular function of a plurality of functions for the controlling the machine in the work area and particular ones of the plurality of functions being monitored by at least one sensor associated with the machine, and each user interface element of the plurality of user interface elements being individually selectable, from the main display by a user of the machine, for independent display on one or more auxiliary displays, and the one or more auxiliary displays being independent of the at least one sensor associated with the machine and dependent upon the main display for content to display from the plurality of user interface elements;

receiving a selection, from the main display, of a first user interface element of the plurality of user interface elements, and a second user interface element of the plurality of user interface elements;

adapting, in real-time, the first user interface element on a first one of the auxiliary displays for display thereon, and the second user interface element on a second one of the auxiliary displays for display thereon, wherein the adapting of the first user interface element is specific to a first layout and appearance for display and utilization on the first one of the auxiliary displays, and the adapting of the second user interface element is specific to a second layout and appearance for display and utilization on the second one of the auxiliary displays;

providing simultaneously the first user interface element for display on the first one of the auxiliary displays, and the second user interface element to the second one of the auxiliary displays; and adjusting at least a first operation of the machine via the main display and adjusting at least a second operation of the machine based on the displaying of the first user interface element on the first one of the auxiliary displays or the second user interface element on the second one of the auxiliary displays, wherein the main display is mounted inside a cabin of the machine and wherein the first one of the auxiliary displays is located on the machine, and the second one of the auxiliary displays is located remotely away from the machine.

8. The system of claim 7 wherein the operations further comprise:

displaying simultaneously the first user interface element on the first one of the auxiliary displays, and the second user interface element on the second one of the auxiliary displays, wherein the first user interface element and the second user interface element display different functions of the plurality of functions, and wherein the first one of the auxiliary displays is void of any user input capability, and the second one of the auxiliary displays has a variety of user input capabilities.

9. The system of claim 7 wherein the operations further comprise:

simultaneously displaying the first user interface element on the first one of the auxiliary displays and the second user interface element on the second one of the auxiliary displays, together with simultaneously displaying both the first user interface element and the second user interface element on the main display, wherein the first user interface element and the second user interface element display different functions of the plurality of functions; and wherein the plurality of user interface elements are associated with at least one of: a mini-view, a full view, a message window, a dialog window, a rate control panel, a calibration panel and a dashboard panel.

10. The system of claim 8 wherein the operations further comprise:

removing the first user interface element from the first one of the auxiliary displays while maintaining the displaying of the first user interface element on the main display.

11. The system of claim 10 wherein the operations further comprise:

moving the first user interface element from the first one of the auxiliary displays to a third auxiliary display of the auxiliary displays.

12. The system of claim 7 wherein the operations further comprising:

receiving a selection, from the first one of the auxiliary displays, of a third user interface element of the plurality of user interface elements for display from the main display to the first one of the auxiliary displays; and providing the third user interface element for display on the first one of the auxiliary displays.

13. The system of claim 7 wherein the main display and the one or more auxiliary displays are proximally located about the machine.

14. A method, the method comprising:

displaying a plurality of user interface elements on a main display associated with a machine traversing a work area, each of the plurality of user interface elements being associated with a particular function of a plurality of functions for controlling the machine in the work area and particular ones of the plurality of functions being monitored by at least one sensor associated with the machine, and each user interface element being individually selectable, from the main display by a user of the machine, for independent display on one or more auxiliary displays, and the one or more auxiliary displays being independent of the at least one sensor associated with the machine and dependent upon the main display for content to display from the plurality of user interface elements;

receiving a selection, from the main display, of a first user interface element and a second user interface element of the plurality of user interface elements;

adapting, in real-time, the first user interface element for viewing on a first one of the auxiliary displays, and the second user interface element for viewing on a second one of the auxiliary displays, wherein the adapting of the first user interface element is specific to a first layout and appearance for display and utilization on the first one of the auxiliary displays, and the adapting of the second user interface element is specific to a second layout and appearance for display and utilization on the second one of the auxiliary displays;

providing simultaneously the first user interface element to the first one of the auxiliary displays, and the second user interface element to the second one of the auxiliary displays; and adjusting at least a first operation of the machine via the main display and adjusting at least a second operation of the machine based on the displaying of the first user interface element on the first one of the auxiliary displays or the second user interface element on the second one of the auxiliary displays, wherein the main display is mounted inside a cabin of the machine and wherein the first one of the auxiliary displays is located on the machine, and the second one of the auxiliary displays is located remotely away from the machine.

15. The method of claim 14 wherein the plurality of user interface elements are associated with at least one of: a mini-view, a full view, a message window, a dialog window, a rate control panel, a calibration panel and a dashboard panel.

16. The method of claim 15 further comprising:

simultaneously displaying on the main display the first user interface element and the second user interface element together with simultaneously displaying the first user interface element on the first one of the auxiliary displays, and the second user interface element on the second one of the auxiliary displays, wherein the first user interface element and the second user interface element display different functions of the plurality of functions.

17. The method of claim 16 further comprising:

removing the first user interface element from the first one of the auxiliary displays while maintaining the displaying of the first user interface element on the main display.

18. The method of claim 15 further comprising:

moving the first user interface element from the first one of the auxiliary displays to a third auxiliary display of the auxiliary displays.

19. The method of claim 15 further comprising:

establishing a distributed display network between the main display and the one or more auxiliary displays.

20. The method of claim 19 wherein the main display and each of the auxiliary displays are associated with a particular one device of a plurality of devices.

21. The method of claim 20 wherein the particular one device is one of a wireless handset, a tablet, a wearable device, a light bar, a machine console and a heads-up display.

22. The method of claim 21 wherein the machine is a tractor, and particular ones of the plurality of functions are associated with an implement connected to tractor, the particular ones of the plurality of functions comprising a physical activity performed by the implement.

23. The method of claim 14 wherein the first one of the auxiliary displays is void of any user input capability, and the second one of the auxiliary displays has a variety of user input capabilities.

24. The method of claim 23 wherein the main display and the one or more auxiliary displays are proximally located about the machine.

25. The method of claim 14 further comprising:

receiving a selection, from the first one of the auxiliary displays, of a third user interface element of the plurality of user interface elements; and providing the third user interface element for display on the first one of the auxiliary displays.

26. The method of claim 20 further comprising:

utilizing at least one embedded function of the particular one device in the controlling the machine based on the first user interface element.

27. A non-transitory computer-readable medium storing computer program instructions for controlling a machine, the computer program instructions, when executed on a processor, cause the processor to perform operations comprising:

displaying a plurality of user interface elements on a main display associated with the machine traversing a work area, each of the plurality of user interface elements being associated with a particular function of a plurality of functions for the controlling the machine in the work area and particular ones of the plurality of functions being monitored by at least one sensor associated with the machine, and each user interface element being individually selectable for independent display, from the main display by a user of the machine, on one or more auxiliary displays, and the one or more auxiliary displays being independent of the at least one sensor associated with the machine and dependent upon the main display for content to display from the plurality of user interface elements;

receiving a selection, from the main display, of a first user interface element and a second user interface element of the plurality of user interface elements;

adapting, in real-time, the first user interface element for viewing on a first one of the auxiliary displays, and the second user interface element for viewing on a second one of the auxiliary displays, wherein the adapting of the first user interface element is specific to a first layout and appearance for display and utilization on the first one of the auxiliary displays, and the adapting of the second user interface element is specific to a second layout and appearance for display and utilization on the second one of the auxiliary displays;

providing simultaneously the first user interface element to the first one of the auxiliary displays, and the second user interface element to the second one of the auxiliary displays; and adjusting at least a first operation of the machine via the main display and adjusting at least a second operation of the machine based on the displaying of the first user interface element on the first one of the auxiliary displays or the second user interface element on the second one of the auxiliary displays, wherein the main display is mounted inside a cabin of the machine and wherein the first one of the auxiliary displays is located on the machine, and the second one of the auxiliary displays is located remotely away from the machine.

28. The non-transitory computer-readable medium of claim 27 wherein the operations further comprise:

receiving a selection, from the first one of the auxiliary displays, of a third user interface element of the plurality of user interface elements; and providing the third user interface element for display on the first one of the auxiliary displays.

29. The non-transitory computer-readable medium of claim 27 wherein the operations further comprise:

simultaneously displaying on the main display the first user interface element and the second user interface element together with simultaneously displaying the first user interface element on the first one of the auxiliary displays, and the second user interface element on the second one of the auxiliary displays, wherein the first user interface element and the second user interface element display different functions of the plurality of functions.

30. The non-transitory computer-readable medium of claim 27 wherein the first one of the auxiliary displays is void of any user input capability, and the second one of the auxiliary displays has a variety of user input capabilities.

* * * * *